United States Patent
Kammerer et al.

(10) Patent No.: US 7,460,010 B2
(45) Date of Patent: Dec. 2, 2008

(54) SYSTEM FOR DETECTING THE ROTATIONAL MOTION OF A SHAFT

(75) Inventors: Eric Kammerer, Langres (FR); Dominique Lutaud, Orbigny au Mont (FR)

(73) Assignee: Carl Freudenberg KG (DE)

( * ) Notice: Subject to any disclaimer, the term of this patent is extended or adjusted under 35 U.S.C. 154(b) by 210 days.

(21) Appl. No.: 10/527,550

(22) PCT Filed: Nov. 13, 2003

(86) PCT No.: PCT/EP03/12695

§ 371 (c)(1),
(2), (4) Date: Nov. 17, 2005

(87) PCT Pub. No.: WO2004/044593

PCT Pub. Date: May 27, 2004

(65) Prior Publication Data
US 2006/0202814 A1     Sep. 14, 2006

(30) Foreign Application Priority Data
Nov. 13, 2002   (DE) ................. 102 53 122

(51) Int. Cl.
G08B 19/00 (2006.01)
G08B 21/00 (2006.01)
F16J 3/00 (2006.01)
F16C 33/76 (2006.01)

(52) U.S. Cl. ............. 340/521; 340/649; 340/671; 340/672; 340/682; 277/317

(58) Field of Classification Search ............ 340/521, 340/679, 671, 672
See application file for complete search history.

(56) References Cited

U.S. PATENT DOCUMENTS

| 4,406,169 | A | * | 9/1983 | Ikeuchi et al. .......... 73/862.541 |
| 5,570,013 | A | | 10/1996 | Polinsky et al. |
| 6,151,962 | A | | 11/2000 | Le et al. |
| 6,345,825 | B1 | | 2/2002 | Guth et al. |
| 2002/0130655 | A1 | | 9/2002 | Okada et al. |

FOREIGN PATENT DOCUMENTS

| DE | 197 10 337 A1 | 9/1998 |
| EP | 0 594 550 A | 4/1994 |
| EP | 0 984 286 | 3/2000 |
| EP | 0 594 559 | 11/2001 |
| FR | 2 833 663 A | 6/2003 |
| JP | 8-507867 | 8/1996 |
| JP | 2002-053019 A | 2/2002 |
| JP | 2002-193083 A | 7/2002 |
| WO | 98/11356 A | 3/1998 |
| WO | WO-02/01086 A2 | 1/2002 |
| WO | WO-02/47924 A1 | 6/2002 |

* cited by examiner

*Primary Examiner*—Donnie L Crosland
(74) *Attorney, Agent, or Firm*—Harness, Dickey & Pierce, P.L.C.

(57) ABSTRACT

The invention relates to a system for detecting the rotational motion of a shaft in a machine housing, comprising a measuring transmitter, which is connected to the shaft, at least one measuring sensor, which is provided on the machine housing, and a measuring transducer connected to a measuring sensor. The invention is characterized in that the measuring sensor(s) (8 and 15 to 20) is/are supplied with current by a separate energy accumulator (11).

6 Claims, 3 Drawing Sheets

Legend
1 – Surrounds
2 – Space
3 – Shaft
4 – Static Seal
5 – Dynamic Seal
6 – Support Ring
7 – Multipole Ring
8 – Measuring Sensor
9 – Stator
10 – Regulator
11 – Current Source
12 – Antenna Circuit
13 – Cover
14 – Measuring Transducer
15 – Sensor
16 – Sensor
17 – Sensor
18 – Sensor
19 – Sensor
20 – Sensor
30 – Sealing System
31 – Sealing Ring
32 – Machine Housing
33 – Signal Transmitter
34 – Control Device Legend
3 – Shaft
6 – Support Ring
7 – Multipole Ring
8 – Measuring Sensor
9 – Stator
10 – Regulator
11 – Current Source
12 – Antenna Circuit
14 – Measuring Transducer
15 – Sensor
16 – Sensor
17 – Sensor
34 – Control Device Legend

| | |
|---|---|
| 1 – Surrounds | 11 – Current Source |
| 2 – Space | 12 – Antenna Circuit |
| 3 – Shaft | 14 – Measuring Transducer |
| 4 – Static Seal | 15 – Sensor |
| 5 – Dynamic Seal | 16 – Sensor |
| 6 – Support Ring | 17 – Sensor |
| 7 – Multipole Ring | 18 – Sensor |
| 8 – Measuring Sensor | 20 – Sensor |
| 9 – Stator | 31 – Sealing Ring |
| 10 – Regulator | 34 – Control Device |

US 7,460,010 B2

SYSTEM FOR DETECTING THE ROTATIONAL MOTION OF A SHAFT

CROSS-REFERENCE TO RELATED APPLICATIONS

This application is a National Stage of International Application No. PCT/EP03/12695, filed Nov. 13, 2003. This application claims the benefit of German Patent Application 102 53 122.6, filed Nov. 13, 2002. The disclosures of the above application are incorporated herein by reference.

FIELD OF THE INVENTION

The present invention relates to a system for detecting the rotational motion of a shaft comprising a measuring transmitter connected to the shaft, at least one measuring sensor provided on the machine housing, and a measuring transducer connected to the measuring sensor.

BACKGROUND OF THE INVENTION

EP 0 984 286 A1 discloses a sealing system whereby the gap between a housing and a shaft is sealed with a sealing ring. In addition to the sealing ring, a multipole ring is placed on the shaft. The multipole ring cooperates with a measuring sensor disposed on the machine housing. By means of the measuring sensor, it is possible to measure, for example, the rotation speed of the shaft. The quantities measured are transmitted through an electric cable to a control unit and/or a display or the like.

DE 43 12 424 C2 also describes the possibility of mounting a sealing ring and a rotation speed transmitter device for the purpose of sealing a shaft passage in an external front wall of a housing.

Moreover, the DE 101 49 642.7 describes a number of embodiments of sealing rings in connection with sensor housings.

The common feature of all prior-art designs is that the measuring sensors, namely the sensing elements, must be supplied with current from the outside and that the quantities measured also must be transmitted via a cable to a display and/or control unit. The cable or cables require a plug connector which reduces the signal accuracy. Moreover, the cables require mounting space and good accessibility, particularly in the event that repairs are needed. Accessibility usually requires additional mounting space.

SUMMARY OF THE INVENTION

The object of the invention is to provide an embodiment that is an improvement over the prior art in that it is of compact design with very small mounting space requirements, provides very high signal accuracy, is simple and inexpensive to fabricate, and involves an only minor mounting expense.

For a system of the aforesaid kind, this objective is reached in that the measuring sensor or measuring sensors are supplied from at least one separate energy accumulator. The measuring sensor or measuring sensors are not supplied from a central current source but have their own directly assigned current source. As a result, the cable carrying the current from a central source can be omitted. Moreover, the measuring sensors are connected with a signal-transmitting unit which receives the signals coming from the sensors and transmits them on to an electronic control device separately disposed at any point of the machine. In the control device, the measured quantities can be displayed and/or subjected to further processing, as needed.

The preferred current source or energy accumulator is an electric battery. In this regard, it is advantageous if in the machine housing opposite the multipole ring there is provided a stator serving as current supplier to the electric battery. In this case, the multipole ring and the stator are of the usual design. For improved signal accuracy, the electric current can be controlled by a regulator inserted into the electric circuit. In this case, there can be provided a measured quantities transducer for converting the sinusoidal measuring signal from the rotational motion of the shaft into, for example, a yes/no signal.

The signal-transmitting unit is provided with a radio antenna which passes on the signals obtained with the sensor or sensors to the electronic control device. The measuring sensors are used primarily to measure the rotational speed, the rotation angle and uneven running. In another embodiment of the invention, use is also made of sensors for measuring the pressure and/or temperature in the space to be sealed off and/or in the surroundings. Furthermore, measuring sensors can also be used for measuring leakage and torque. It is particularly advantageous to combine the measuring system with a sealing ring into a single unit.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

Figure 1:
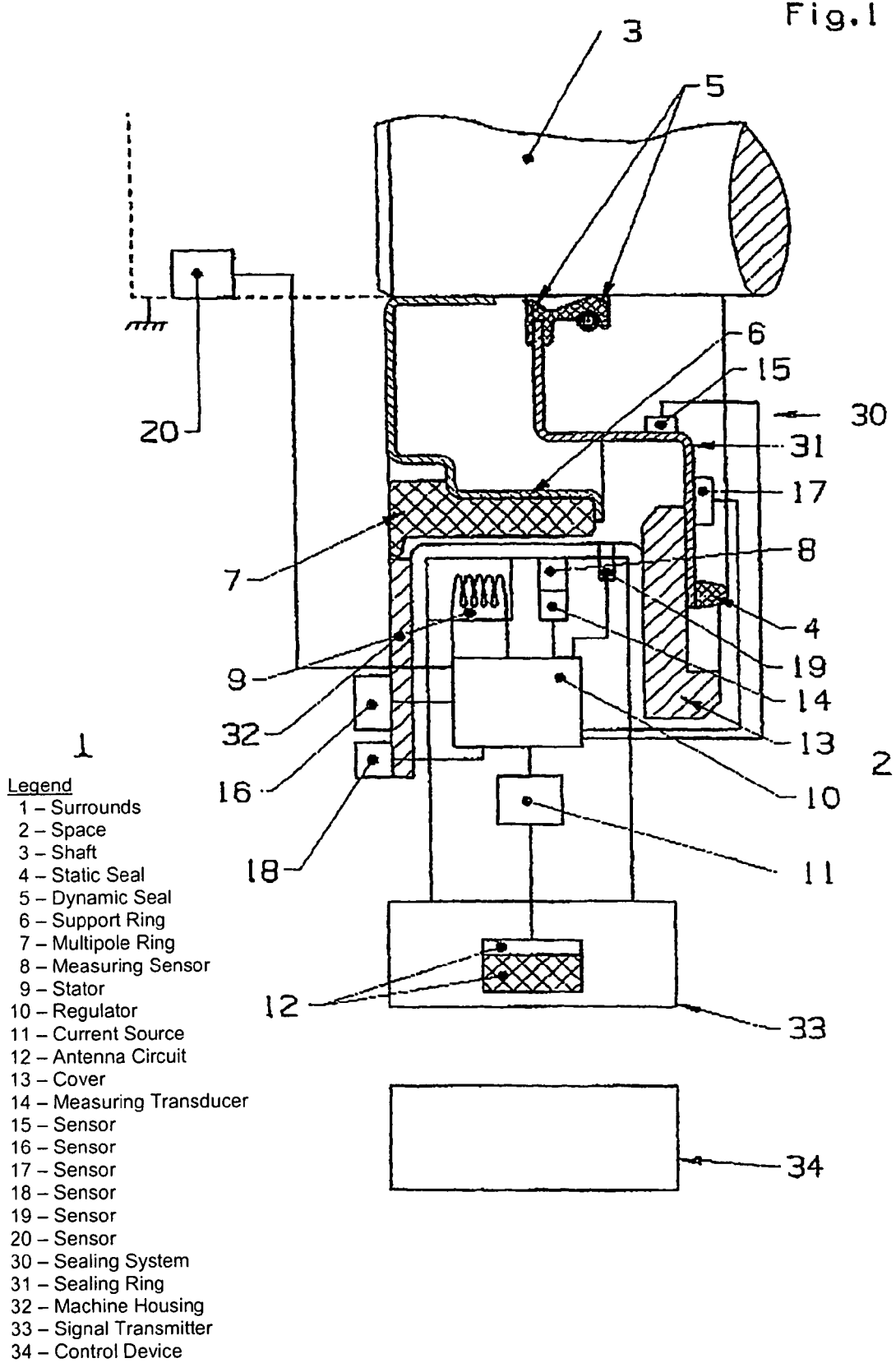
FIG. 1 is a schematic cross-sectional representation of a system according to a principle of the present invention.

FIG. 1 shows an exemplary embodiment of the invention in interaction with a seal. Sealing system 30 is provided to seal the gap between the shaft 3 and a housing (not shown in detail) with a cover 13. Sealing system 30 can be of any desired kind known in the art. In the present example, it consists of a sealing ring 31 fastened to cover 13. At the fastening site between sealing ring 31 and cover 13 there is provided a static seal 4 made of a polymeric material. Dynamic seal 5 on shaft 3 is formed by a polymeric insert provided with two sealing lips and is additionally pressed against shaft 3 by a spiral-tension spring ring. Solidly connected with shaft 3 is a support ring 6 to which multipole ring 7 is fastened. Multipole ring 7 is of a known design.

Measuring sensor 8 is disposed radially opposite multipole ring 7 in machine housing 32. Measuring sensor 8 is connected via a measuring transducer 14 and a regulator 10 with its own current source 11 or the energy accumulator. Current source 11 at the same time also supplies signal transmitter 33 which is fitted with antenna circuit 12. The signals sent by signal transmitter 33 are received by control device 34 which is separately disposed in housing 32 and subjects the signals to further processing. An electric battery is used as the current source 11. Connected with the electric battery is stator 9 which in conjunction with multipole ring 7 serves as current supplier for electric battery 11. Multipole ring 7 and stator 9 are designed for current generation. Regulator 10 is intended to provide regulation of the electric current or also of the measuring signals coming from sensors 8. Also provided besides sensor 8 is sensor 15 for measuring the pressure in space 2 that is to be sealed off. Furthermore a sensor 16 for measuring the pressure in the surroundings 1, as well as sensors 17 and 18 for measuring the temperatures in space 2 that is to be sealed off and in the surroundings 1, are provided. Moreover, a sensor 19 can be added as measuring transmitter for leakage. Finally, a sensor 20 is fastened to shaft 3 as a measuring transmitter for torque. A sealing system 30 configured in this manner provides wireless signal transmission from the sensors located in the region of shaft 3 to the control device 34 of the machine. Supply cables for electric current and connecting cables for signals are not needed. The incidence of errors is substantially reduced, and the transmission of different measuring quantities by the same antenna circuit is carried out without any problems. Preferably, the components of the sensing system are held on their particular support with appropriate fastening means, for example screws, so that they can be detached in a non-destructive manner. They can also be soldered, clamped, cemented, clipped or cast on.

Figure 2:
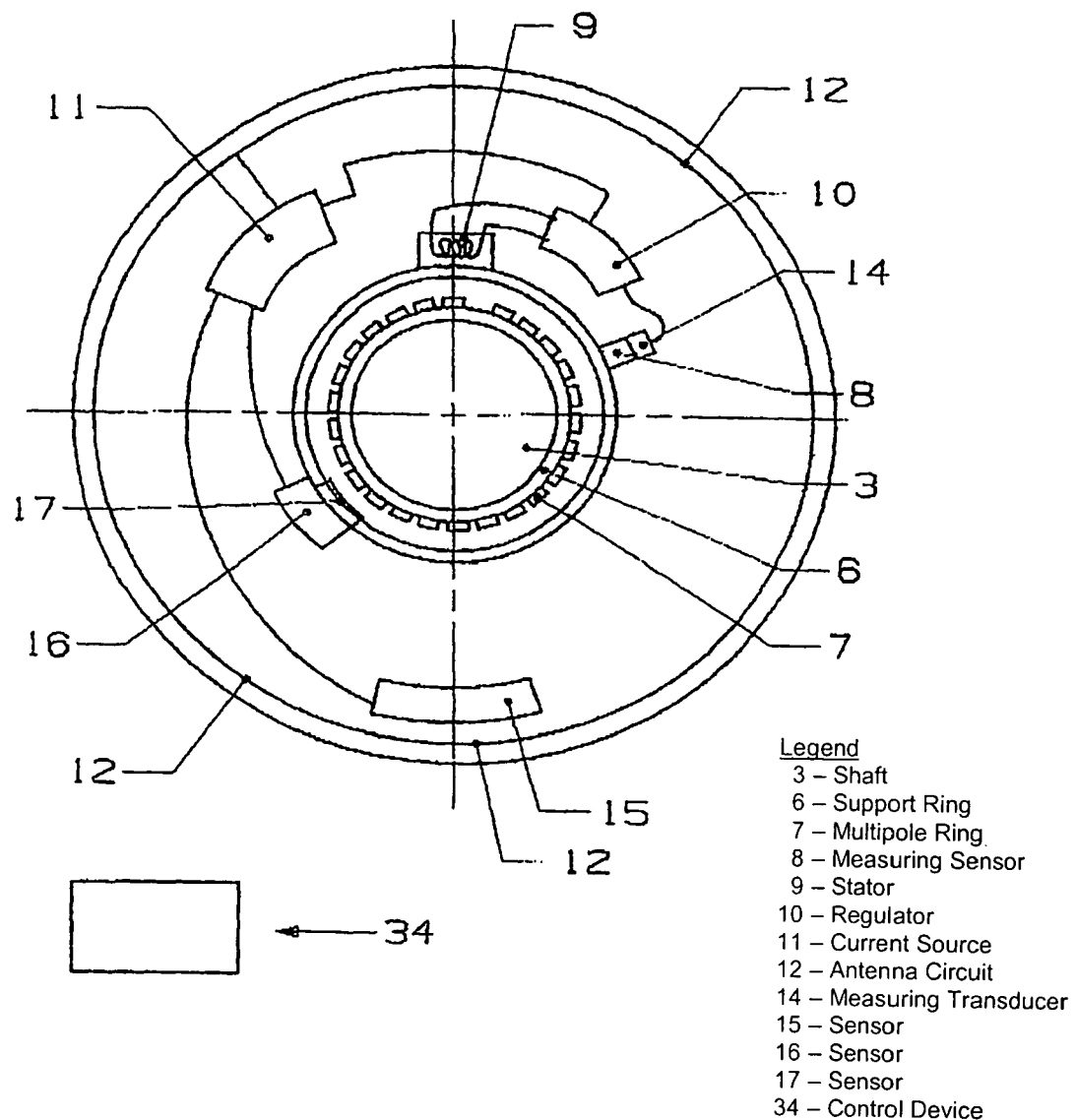
FIG. 2 is a top view of the sensor system according to a principle of the present invention.

FIG. 2 shows schematically the local placement of the most important parts of the measuring system. Connected to shaft 3, via support ring 6, is multipole ring 7. Stator 9 is fastened to the machine housing, and the current generated therein is regulated by regulator 10 and transmitted on to sensor 8 via measuring transducer 14. At the same time, current source 11 is supplied and it, in turn, supplies additional sensors 15, 16 and 17. Control device 34 receives signals via antenna circuit 12.

Figure 3:
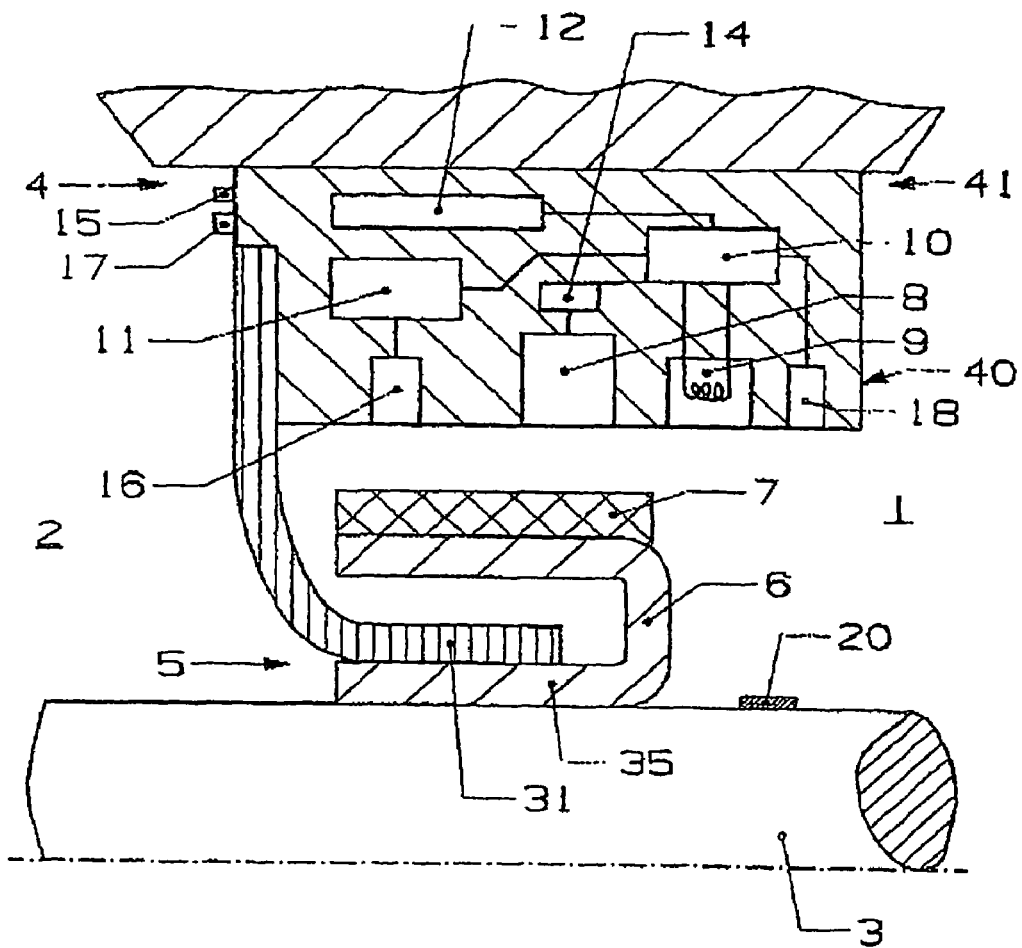
FIG. 3 shows another possible embodiment of the system according to a principle of the present invention in cross-section.

FIG. 3 shows in cross-section another embodiment of the system of the present invention. Here, the entire sensor system including current generation and signal transmission is combined in block 40 which is inserted into a housing opening 41. The reference numerals used correspond to those in FIG. 1. The seal used in this example is different, but is also integrally connected with block 40. The seal is a combination ring in which sealing ring 31 is disposed on a counter-ring 35 placed on shaft 3.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A system for detecting a rotational motion of a shaft in a machine housing comprising:
   a seal disposed on the shaft;
   a measuring transmitter connected to the shaft;
   at least one measuring sensor provided on the machine housing;
   a measuring transducer connected to the measuring sensor;
   a regulator that regulates the electric current; and
   a transmitting unit for wireless transmission of measured quantities to a separately disposed electronic control device,
   wherein the measuring sensor is supplied with electric current by a separate energy accumulator, and
   the seal, the measuring sensor, regulator, energy accumulator, and transmitting unit are integrally combined into a unitary block inserted into an opening in the housing.

2. The system as defined in claim 1, wherein the electric current supplied by the energy accumulator is generated by a multipole ring connected to the shaft, and in cooperation with an oppositely disposed stator.

3. The system as defined in claim 1, wherein the electric current is regulated by a regulator inserted into an electric circuit.

4. The system as defined in claim 1, wherein the measuring transducer converts a sinusoidal measuring signal from the rotational motion of the shaft into a yes/no signal.

5. The system as defined claim 1, wherein the transmitting unit includes a radio antenna that transmits signals received from the measuring sensor on to the electronic control device.

6. The system as defined in claim 1, wherein the measuring sensor measures at least one of a pressure, speed, position, a temperature, a leakage, or a torque at the space to be sealed off in its surrounding area.

* * * * *